(No Model.)
F. H. PALMER.
MUCILAGE HOLDER.
No. 482,750.  Patented Sept. 20, 1892.
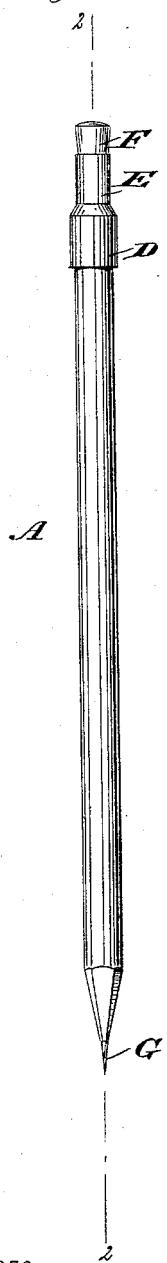
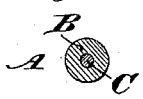
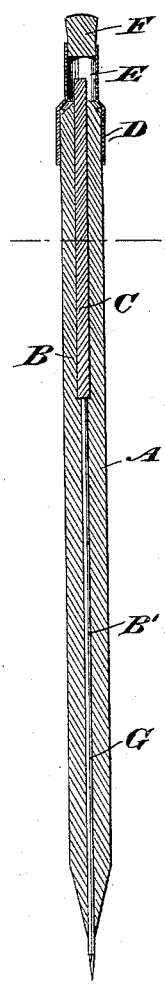
WITNESSES:
Chas. Nida.
C. Sedgwick
INVENTOR
F. H. Palmer
BY Munn & Co
ATTORNEYS.

UNITED STATES PATENT OFFICE.

FRANK H. PALMER, OF BROOKLYN, NEW YORK.

MUCILAGE-HOLDER.

SPECIFICATION forming part of Letters Patent No. 482,750, dated September 20, 1892.

Application filed November 20, 1891. Serial No. 412,553. (No model.)

*To all whom it may concern:*

Be it known that I, FRANK H. PALMER, of Brooklyn, in the county of Kings and State of New York, have invented a new and Improved Mucilage-Holder, of which the following is a full, clear, and exact description.

The object of the invention is to provide a new and improved mucilage-holder, which is simple in construction, designed for pocket use, and arranged for conveniently gumming at all times papers, envelopes, stamps, &c.

The invention consists of a wooden casing formed with a central bore, in which is fastened a stick of mucilage, one end of which projects at the end of the casing, which latter can be cut down as the protruding end of the mucilage wears off.

The invention also consists of certain parts and details and combinations of the same, as will be hereinafter described, and then pointed out in the claims.

Reference is to be had to the accompanying drawings, forming a part of this specification, in which similar letters of reference indicate corresponding parts in all the views.

Figure 1 is a side elevation of the improvement. Fig. 2 is a sectional side elevation of the same on the line 2 2 of Fig. 1, and Fig. 3 is a sectional plan view of the same on the line 3 3 of Fig. 2.

The improved mucilage-holder is provided with a casing A, made of wood and formed with a central bore B, adapted to receive a stick of mucilage C, fastened in the said bore and having one end projecting at the end of the bore, as plainly illustrated in Fig. 2.

The stick of mucilage C is prepared so that when the projecting end is moistened the operator can conveniently by manipulating the casing A gum any desired article, the protruding and moistened end being rubbed over the part to be gummed. As the end of the gum-stick wears off, the end of the casing A adjacent to it is cut down to have a sufficient length of the gum-stick projecting for convenient use, as above described.

In order to protect the projecting or protruding end of the stick C, a cap D is employed, fitting over this end of the casing. The cap D is provided with the reduced portion E, into which extends the projecting end of the stick, and in the upper end of this reduced end is fitted a rubber F for use as an eraser in the usual manner.

As shown in the drawings, the mucilage-holder is preferably combined with a lead-pencil, the casing A being provided for this purpose with two bores B and B', arranged concentric, and of which the latter receives the lead G, while the other B is somewhat larger in diameter and contains the stick C, as above described.

A mucilage-holder constructed in this manner is very convenient for immediate use, being always ready and only requiring the removal of the cap D and moistening of the projecting end to apply the gum to the desired article.

Having thus fully described my invention, I claim as new and desire to secure by Letters Patent—

1. A mucilage-holder comprising a wooden casing formed with a central bore and a stick of mucilage permanently fastened in the said bore and having one end projecting at the end of the casing, substantially as shown and described.

2. In a mucilage-holder, the combination, with a wooden casing having a central bore, of a stick of mucilage permanently fastened in the said central bore and having one end projecting beyond the cut-down end of the said casing, and a cap fitting over the cut-down end of the casing and protecting the projecting end of the mucilage-stick, substantially as shown and described.

3. In a mucilage-holder, the combination, with a casing having a central bore, of a stick of mucilage permanently secured in the said bore and projecting at one end thereof and a cap fitted over the said casing at the projecting end of the mucilage-stick, the said cap being provided with a reduced end into which extends the projecting end of the stick of mucilage, substantially as shown and described.

4. The combination, with a casing having two concentric bores, of a stick of mucilage permanently secured in one of the said bores and a stick of lead secured in the other bore, the said sticks extending in opposite directions to project at the ends of the casing, substantially as shown and described.

FRANK H. PALMER.

Witnesses:
THEO. G. HOSTER,
C. SEDGWICK.